(12) United States Patent
Nemoto et al.

(10) Patent No.: US 7,518,277 B2
(45) Date of Patent: Apr. 14, 2009

(54) ELECTRIC MOTOR

(75) Inventors: Kanako Nemoto, Hitachinaka (JP);
Yasushi Takano, Hitachinaka (JP);
Michiyuki Takagi, Hitachinaka (JP);
Fumio Tajima, Hitachi (JP); Akira Nezu, Yokohama (JP); Tsukasa Yamazaki, Yokohama (JP); Shunji Ooki, Yokohama (JP); Masahide Kimura, Yokohama (JP); Yasushi Fujita, Yokohama (JP)

(73) Assignees: Hitachi, Ltd., Tokyo (JP); Nissan Motor Co., Ltd., Yokohama-shi (JP)

( * ) Notice: Subject to any disclaimer, the term of this patent is extended or adjusted under 35 U.S.C. 154(b) by 206 days.

(21) Appl. No.: 10/558,366

(22) PCT Filed: May 26, 2004

(86) PCT No.: PCT/JP2004/007592

§ 371 (c)(1),
(2), (4) Date: Nov. 29, 2005

(87) PCT Pub. No.: WO2004/107529

PCT Pub. Date: Dec. 9, 2004

(65) Prior Publication Data

US 2007/0205689 A1      Sep. 6, 2007

(30) Foreign Application Priority Data

May 29, 2003    (JP) .............................. 2003-151917

(51) Int. Cl.
*H02K 1/27*     (2006.01)
*H02K 37/12*    (2006.01)

(52) U.S. Cl. .............................. 310/156.47; 310/49 R; 310/156.45

(58) Field of Classification Search ............ 310/156.25, 310/156.38, 156.43–156.48, 49 R
See application file for complete search history.

(56) References Cited

U.S. PATENT DOCUMENTS 4,642,502 A * 2/1987 Carpenter et al. ...... 310/156.12

(Continued)

FOREIGN PATENT DOCUMENTS

GB        2 158 653 A       11/1985

(Continued)

OTHER PUBLICATIONS

Japanese Office Action dated Aug. 19, 2008 (Two (2) pages.).

*Primary Examiner*—Tran N Nguyen
(74) *Attorney, Agent, or Firm*—Crowell & Moring LLP

(57) ABSTRACT

The vibration and noise excited by the electromagnetic exciting force in the radial direction of an electric motor are suppressed.

In an electric motor 100, a rotor 1 is divided into four rotor pieces 3, 4, 5, and 6 for an axial length of 2L of one group of the rotor core, and for example, the four rotor pieces 3, 4, 5, and 6 are ideally 0.29L, 0.71L, 0.71L, and 0.29L in axial length in the axial direction, and permanent magnets 2 of the rotor pieces 3, 4, 5, and 6 are arranged in the circumferential direction so that the phase differences of the electrical angle are 0, π, 0, and π. Further, when an effect is obtained even if the ideal axial length is changed, the tolerance of the aforementioned axial length is ±0.1L.

15 Claims, 15 Drawing Sheets

U.S. PATENT DOCUMENTS

| | | | |
|---|---|---|---|
| 5,355,044 A * | 10/1994 | Uchida et al. | 310/162 |
| 5,397,951 A * | 3/1995 | Uchida et al. | 310/156.21 |
| 5,760,503 A * | 6/1998 | Tsuchida et al. | 310/49 R |
| 6,252,323 B1 * | 6/2001 | Nishikawa et al. | 310/156.01 |
| 6,657,349 B2 * | 12/2003 | Fukushima | 310/156.47 |
| 6,940,198 B2 * | 9/2005 | Ionel et al. | 310/156.47 |

FOREIGN PATENT DOCUMENTS

| | | |
|---|---|---|
| JP | 60-181174 | 9/1985 |
| JP | 60-1871174 U | 12/1985 |
| JP | 61-10953 A | 1/1986 |
| JP | 06-245417 | 9/1994 |
| JP | 11-18339 A | 1/1999 |
| JP | 2000-060039 | 2/2000 |
| JP | 2000-069695 | 3/2000 |
| JP | 2000-245117 | 9/2000 |
| JP | 2000-278895 A | 10/2000 |
| JP | 2000-308286 | 11/2000 |
| JP | 2001-231196 | 8/2001 |
| JP | 2001-359266 | 12/2001 |
| JP | 2001-359266 A | 12/2001 |

* cited by examiner (a)

(b)

EXCITING FORCE PATTERN

NOTE: ⊠ PHASE DIFFERNCE 0
☐ AXIAL DIRECTION

ELECTRIC MOTOR

BACKGROUND OF THE INVENTION 1. (Field of the Invention)

The present invention relates to an electric motor and more particularly to a structure for suppressing generation of electromagnetic vibration and noise caused by electromagnetic exciting force in the radial direction of an inverter motor.

2. (Prior Art)

Many electric motors are used in household electric appliances and various office automation devices and furthermore in recent years, have been loaded in electric cars.

The motors are required for large output power, thus vibration and noise due to electromagnetic exciting force are caused.

The electromagnetic exciting force in the radial direction is generated when, during mutual movement of a rotor and a stator, the electromagnetic path of magnetic field flux generated from the magnetic poles of the rotor is periodically changed whenever the magnetic poles of the rotor cross the openings of the slots formed on the stator and the magnetic flux distribution in the gap is changed. The time harmonic order, space harmonic order, and amplitude of the electromagnetic exciting force in the radial direction depend on the number of poles of the effective pole opening angle of the rotor and the number of slots formed in the stator.

On the other hand, due to the pursuit of a comfortable environment in a house and a car, a request for reduction in vibration and noise is increased and arts for reducing them have been developed.

As one of the arts for reducing vibration and noise, a skew is formed in the rotor of the electric motor. As a means for forming the skew, the following may be cited.

In Patent Document 1, the outer peripheral surface of the shaft is divided equally into several parts in the axial direction in the process of manufacturing the rotor by fixing the piece-shaped permanent magnets to the positions equally distributed on the outer peripheral surface, and the projections are formed on the outer peripheral surface of the shaft by pressing in the respective divided rows, and the permanent magnets are fixed using the projections for positioning the permanent magnets, and the skews are provided by attaching the balance weights to the tops of the projections when necessary, and insurance of positioning of the permanent magnets and skew angle, simplification of the steps, and reduction in the number of parts are realized.

In Patent Document 2, the same poles of a plurality of ring permanent magnets multi-pole-magnetized in the axial direction are installed opposite to each other at a gap of t by forming a positioning slot in the motor shaft as a guide, thus the rotor magnet is structured so as to direct the magnetic flux lines in the radial direction, and the characteristic of the surface flux density is improved remarkably, and miniaturization and high performance of the motor are realized.

In Patent Document 3, the magnet built-in rotor of the rotating machine is composed of a plurality of divided cylindrical bodies having a plurality of built-in permanent magnets so as to form magnetic poles whose polarity differs alternately in the rotational direction and a shaft for supporting the cylindrical bodies in a laminated state. The divided cylindrical bodies are laminated in the axial direction that the respective magnetic poles are shifted in the rotational direction, are fit into the shaft, are joined in the rotational direction, thereby are connected integrally with each other. By doing this, torque ripples are reduced, and the smooth rotation of the rotor is ensured, and a rotating machine can be obtained at a low cost.

In Patent Document 4, in the brushless DC motor composed of the rotor having a mounted permanent magnets and the stator having a plurality of slots, the effective pole opening angle of the rotor is set to a value obtained by adding the angle equivalent to one slot opening to an integer times of the slot pitch of the stator, and the rotor is divided into several parts in the axial direction, and the divided parts of the rotor are structured so as to be shifted around the shaft by the mechanical angle equivalent to one half of the period regarding to the respective cogging torque.

Patent Document 1: Japanese Application Patent Laid-open No. Hei 6-245417

Patent Document 2: Japanese Application Patent Laid-open No. 2000-245117

Patent Document 3: Japanese Application Patent Laid-open No. 2000-308286

Patent Document 4: Japanese Application Patent Laid-open No. 2001-359266

SUMMARY OF THE INVENTION

However, Patent Document 1 is effective in reduction in the cogging torque, reduction in the unbalance force, and reduction in the number of parts, though the effect in reduction in vibration and noise due to the electromagnetic exciting force in the radial direction is low.

Patent Document 2 is also effective in reduction in the cogging torque, though it cannot be applied to a case that no gap can be formed, and no effect is obtained in reduction in vibration and noise due to the electromagnetic exciting force in the radial direction.

Patent Document 3 is effective in reduction in torque ripples, though an effect is not always obtained in reduction in vibration and noise due to the electromagnetic exciting force in the radial direction.

Patent Document 4 is effective in suppression of bending vibration of the rotation shaft induced by the cogging torque. However, an effect is not always obtained in suppression of the longitudinal bending deformation mode of the stator induced by the electromagnetic exciting force in the radial direction of an internal rotation motor.

An object of the present invention is to reduce vibration due to electromagnetic exciting force in the radial direction of an electric motor, thereby provide an electric motor of low noise.

In the electric motor of the present invention, a rotor or a stator is divided into four or more even rotor pieces or stator pieces (although "divided" is specified here, a predetermined number of pieces seeming as divided is included) for an axial length of 2L. For each rotor piece or stator piece, so as to generate the electromagnetic exciting force in the radial direction orthogonalized with the longitudinal bending deformation modes of the stator, the axial length and the relative position in the circumferential direction of the effective pole opening angle included in each rotor piece or stator piece are decided.

The rotor or stator is divided into 4 or 4n (n indicates an integer, 4 forms one group) pieces in the axial direction, and the length and electrical angle of each piece, assuming the axial length of one group of the rotor core or stator core as 2L, the axial direction as the X-axis, the axial center as x=0, and the electromagnetic exciting force in the radial direction as $F(x)$, on the basis of the following three relational formulas:

$$\int_{-L}^{L} F(x)dx = 0$$

$$\int_{-L}^{L} xF(x)dx = 0$$

$$F(-x) = -F(x)$$

are set according to the relationship between the equivalent axial length and the equivalent position shifted between the pieces in the circumferential direction and are arranged in the setting order.

When the rotor or stator is divided into 4 (4n included) rotor pieces or stator pieces, the axial length of the four rotor pieces or stator pieces obtained ideally by the three formulas aforementioned is basically 0.29L, 0.71L, 0.71L, and 0.29L, and the equivalent axial length is set on the basis of the reference values, and the effective pole opening angle of one pole of the respective rotor pieces or stator pieces, so as to set the phase difference of the electrical angle between the respective rotor pieces or stator pieces in the circumferential direction of the rotor or stator to 0, π, 0, and π, is set to, for example, an angle shifted by one half of the slot between the pieces. At this time, the electrical angle used corresponds to the slot ripple component and one period (2π) is the slot pitch.

When the rotor or stator is divided into 6 (6n included) rotor pieces or stator pieces, the axial length of the six rotor pieces or stator pieces obtained ideally by the three formulas aforementioned is set to 0.25L, 0.5L, 0.25L, 0.25L, 0.5L, and 0.25L and the rotor pieces or stator pieces are arranged in the setting order. And, the effective pole opening angle of one pole of the respective rotor pieces or stator pieces, so as to set the phase difference of the electrical angle between the respective rotor pieces or stator pieces in the circumferential direction of the rotor or stator to 0, π, 0, π, 0, and π, is set to, for example, an angle shifted by one half of the slot between the pieces.

DETAILED DESCRIPTION OF THE INVENTION

DESCRIPTION OF THE PREFERRED EMBODIMENTS

Hereinafter, the embodiments of the present invention will be explained with reference to the accompanying drawings.

Figure 1:
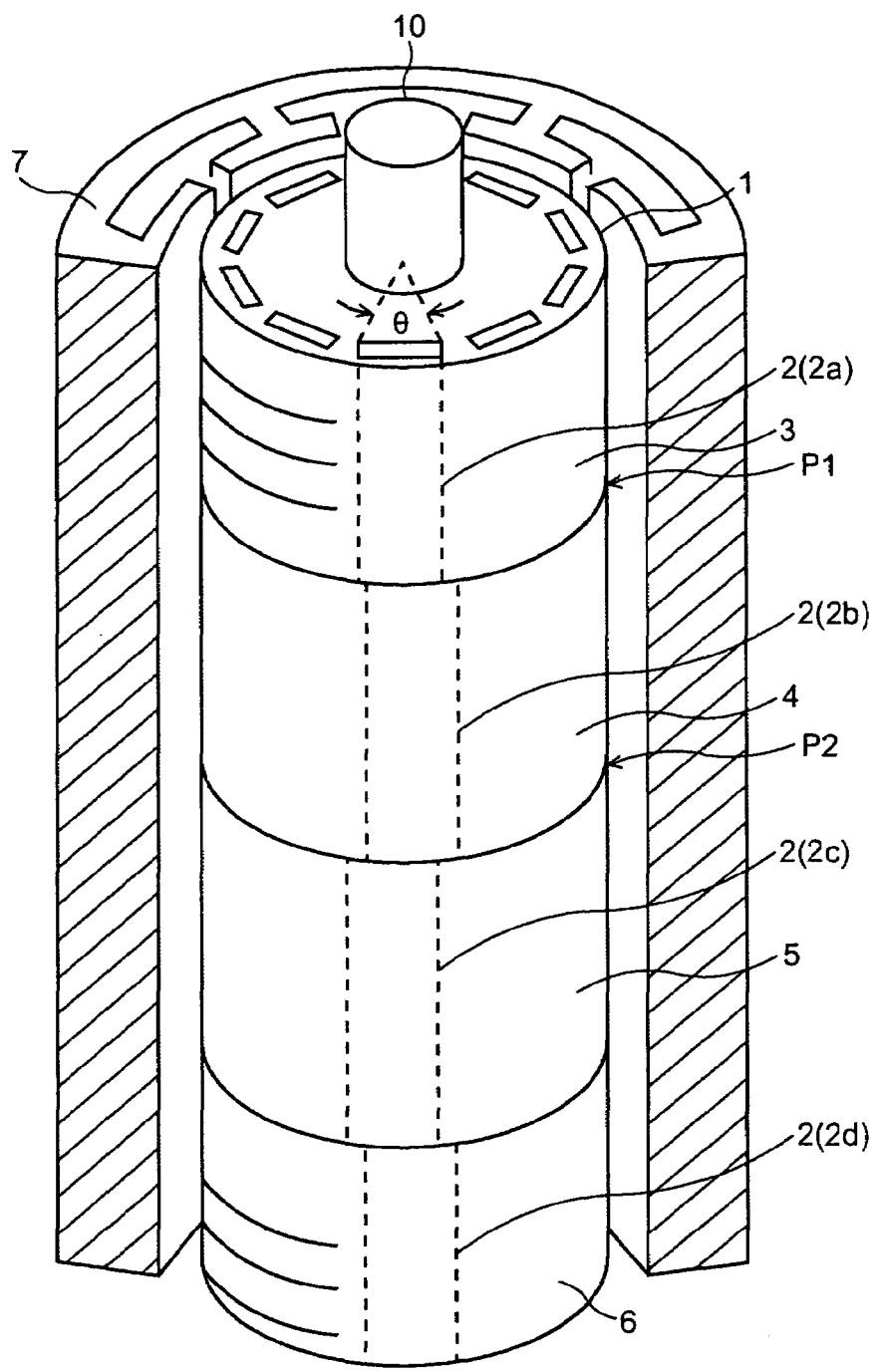
FIG. 1 is a drawing showing an embodiment of the rotor of the electric motor of the present invention.
Figure 3:
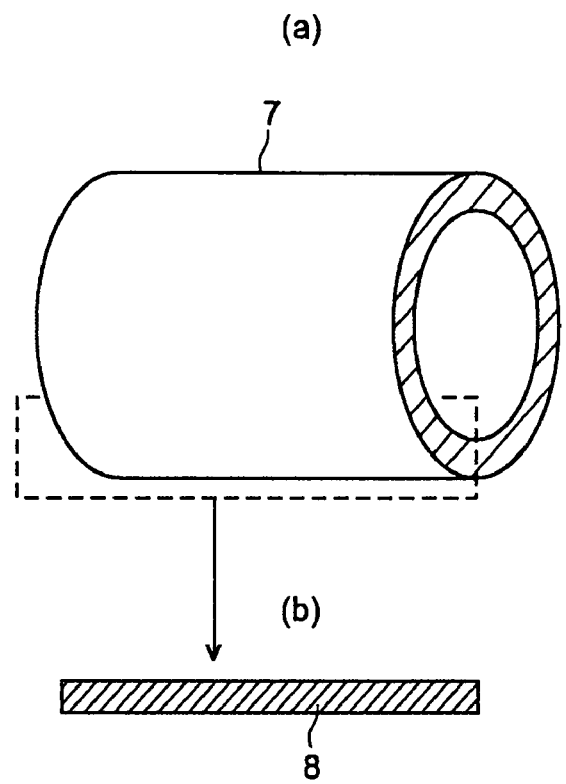
FIG. 3 is a drawing showing the position relationship between the stator core and the cross section of the stator core in the axial direction.

FIG. 1 is a drawing showing an embodiment of a rotor and a stator 7 in an example of a permanent magnet motor of an electric motor 100 of the present invention. FIG. 3 shows a conceptual diagram of the stator core (stator) 7, and FIG. 3(a) shows the cylindrical shape, and FIG. 3(b) shows the section 8 thereof. In these drawings, the core of the rotor 1 is composed of laminated steel plates and the laminated steel plates are divided into a plurality of blocks in the axial direction, that is, rotor pieces. The rotor 1 shown in FIG. 1 is composed of four rotor pieces 3, 4, 5, and 6, a shaft 10, and permanent magnets 2 (2a, 2b, 2c, 2d) having the same axial length as the axial length of the rotor pieces 3, 4, 5, and 6 in the axial direction. The permanent magnets 2 respectively have an effective pole opening angle of θ.

Figure 16:
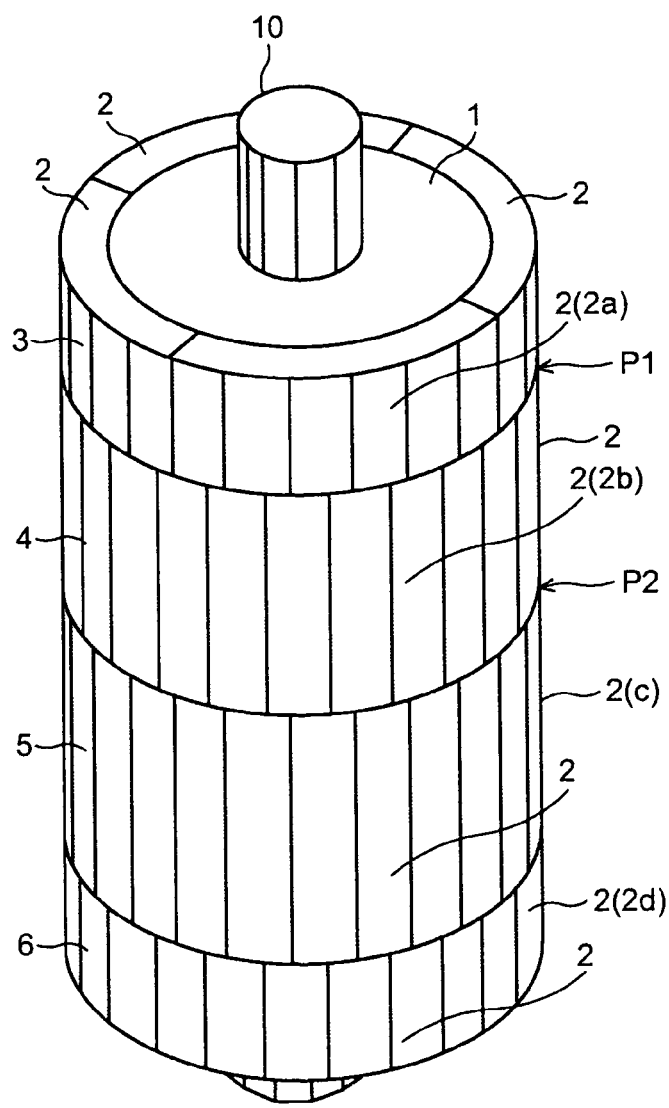
FIG. 16 is a drawing showing an application example of the present invention shown in FIG. 1 to a surface magnet motor.

In FIG. 1, the permanent magnets 2 having the effective pole opening angle are embedded in the core of the rotor 1, though as shown in FIG. 16, the permanent magnets may be attached to the core surfaces of the rotor 1. Further, the effective pole opening angle may be realized by magnetizing a ring magnet.

The axial length and the phase difference of electrical angle which is decided by the position of the effective pole opening angle in the circumferential direction of the rotor pieces 3, 4, 5, and 6 and is decided by the following conception.

The present invention uses a combination pattern of the axial length and the phase difference of the electrical angle when harmonic components of the electromagnetic exciting force, generated by the electrical characteristic, are orthogonalized with the longitudinal deformation modes of the stator core 7.

Assuming the mode shapes of the stator core 7 of the electric motor 100, when the vibration and noise problem occurs as longitudinal bending deformation bending modes of the beam order 0, 1, and 2, a pattern of electromagnetic exciting force in the radial direction for suppressing those modes will be considered.

For simple examination, a structural consists of only the stator core 7, and the axial length of the stator core 7 is the same as the core axial length of the rotor 1 such as 2L, and the boundary condition of the stator core 7 is both ends free or both ends fixed, and the stator core 7 is a beam, and the axial length of the rotor pieces 3, 4, 5, and 6 is the same as that of the permanent magnets 2 included in the rotor pieces 3, 4, 5, and 6. When the rotor 1 has end plates, the axial length 2L does not include the axial length of the end plates.

Figure 2:
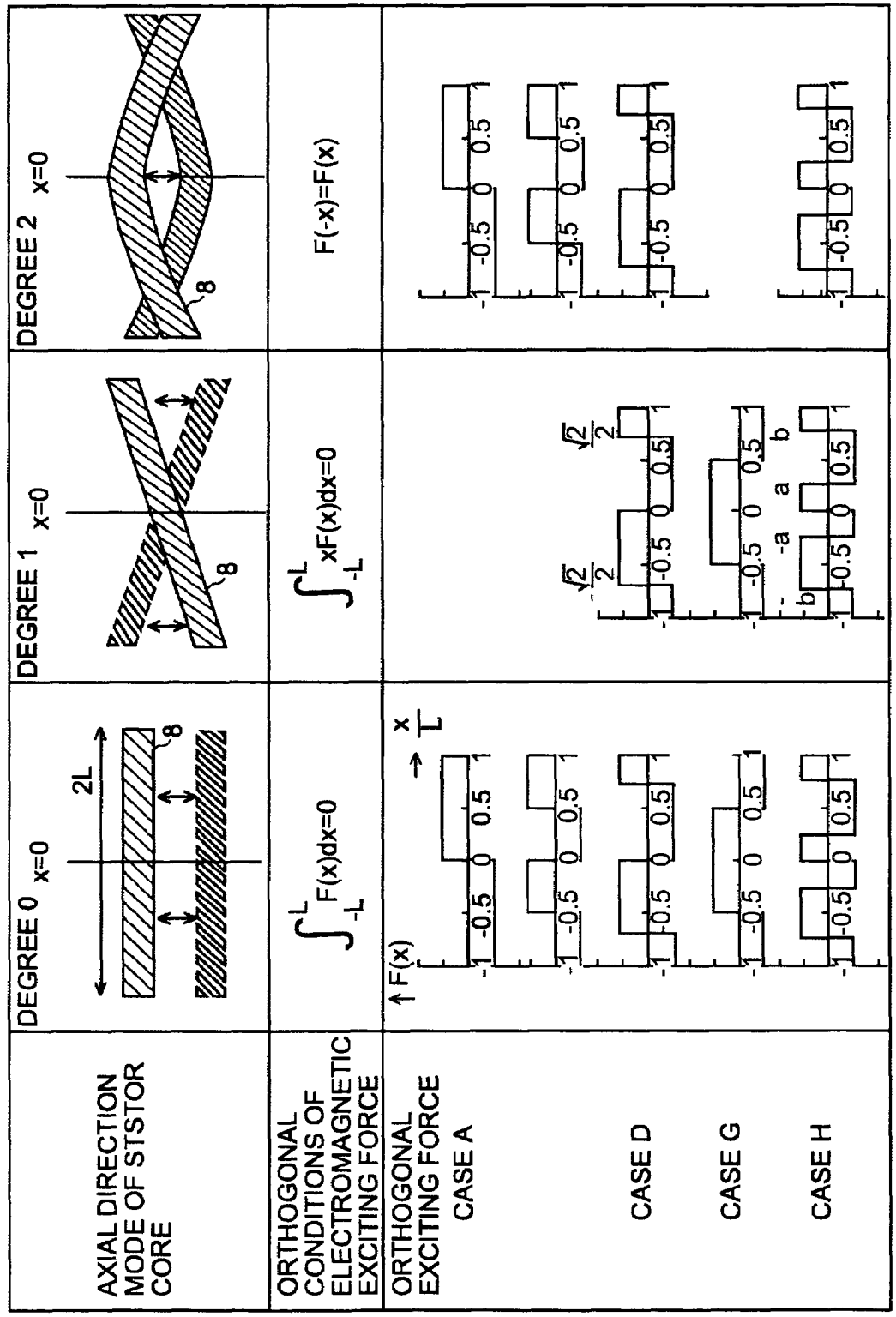
FIG. 2 is a drawing showing the exciting force pattern of the electric motor of the present invention and the orthogonal conditions which the electromagnetic exciting force in the radial direction must meet.

At this time, for the longitudinal bending deformation modes of the beam order 0, 1 and 2, the orthogonal conditions shown in FIG. 2 may be considered. Case D shown in FIG. 2 that meets the formulas indicated below is taken for example, and the decision of the axial length of each rotor pieces 3, 4, 5, and 6 will be considered.

Figure 4:
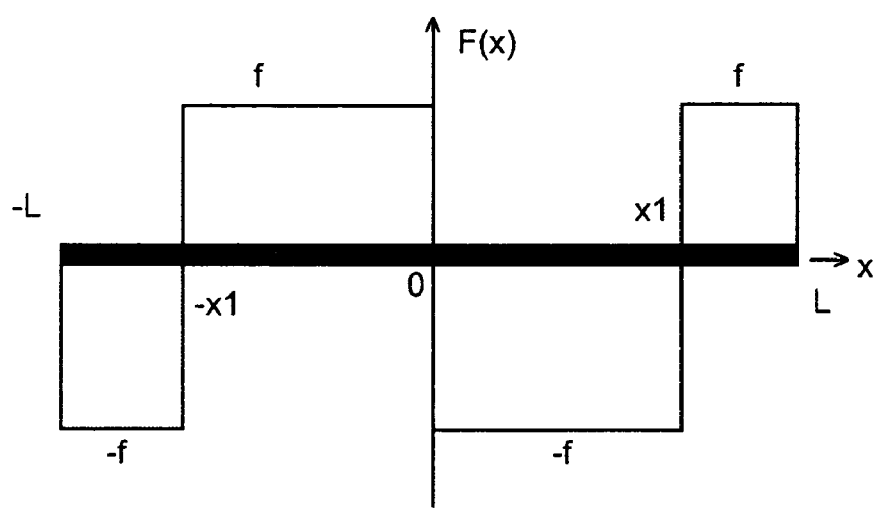
FIG. 4 is a drawing showing the exciting force pattern of the rotor pieces when the rotor core is divided into 4 pieces.

For simple development of the formulas, as shown in FIG. 4, the stator core 7 is assumed as a one-dimensional beam parallel to the x-axis and the force exiting the stator core 7 is assumed as one-dimensional force in the y-axis direction. The axial length of the stator core 7 is set to 2L.

The one-dimensional beam is divided into four parts so as to be symmetrical about the central point O of the x-axis of the stator. The forces exiting each part symmetrical about the point O, for example, and their amplitudes are set to f and −f (f is a constant). This is a constitution that electromagnetic exciting force having the practically same amplitude in the radial direction is applied to each piece.

Assuming a function of force as F(x), by such division, the following conditional formulas are considered to be satisfied.

Formula 1

$$\int_{-L}^{L} F(x)dx = 0 \qquad \text{Formula 1}$$

Formula 2

$$F(-x) = -F(x) \qquad \text{Formula 2}$$

Formulas 1 and 2 are satisfied and furthermore Formula 3 indicated below is considered to be satisfied. Here, Formula 1 sets the integral value to 0 and suppresses the longitudinal bending deformation mode order 0 and Formula 2 sets the point symmetrical vibration to 0 and suppresses the longitudinal bending deformation mode order 2. Formula 3 sets the moment value to 0 and suppresses the longitudinal bending deformation mode order 1. The number of divided pieces is plural and even such as four or more particularly from the obtained solution.

Formula 3

$$\int_{-L}^{L} xF(x)dx = 0 \qquad \text{Formula 3}$$

The moment M applied to the one-dimensional beam is expressed by the following formula.

Formula 4

$$M = -\int_{-L}^{-x_1} xf\,dx + \int_{-x_1}^{0} xf\,dx - \int_{0}^{x_1} xf\,dx + \int_{x_1}^{L} xf\,dx \qquad \text{Formula 4}$$

The above formula is properly arranged as the following formula.

Formula 5

$$M = 2\left(-\int_{0}^{x_1} xf\,dx + \int_{x_1}^{L} xf\,dx\right) \qquad \text{Formula 5}$$

Here, when the condition for the moment M=0 is introduced, the following formula is obtained.

$$-\int_{0}^{x_1} xf\,dx + \int_{x_1}^{L} xf\,dx = 0 \qquad \text{Formula 6}$$

When the above formula is solved, in a case of four divided pieces, the following relationship is held between x1 and L.

Formula 7

$$x_1 = \frac{1}{\sqrt{2}} L \approx 0.71 L \qquad \text{Formula 7}$$

The above relationship is held even if the stator core 7 has a cylindrical surface and the exiting force is three-dimensional electromagnetic exciting force in the radial direction of the circular mode order n whose center is the x-axis.

Therefore, the rotor 1 is divided into the rotor pieces 3, 4, 5, and 6 having an axial length of:

Formula 8

$$\left(1 - \frac{1}{\sqrt{2}}\right)L, \frac{1}{\sqrt{2}}L, \frac{1}{\sqrt{2}}L, \left(1 - \frac{1}{\sqrt{2}}\right)L \qquad \text{Formula 8}$$

and the neighboring rotor pieces are shifted in the circumferential direction so as to set the phase differences of the respective electrical angles to 0, π, 0, and π, and the permanent magnets 2 are positioned in the circumferential direction, thus the moment applied to the stator core 7 ideally becomes 0, and the beam bending deformation modes order 0, 1, and 2 can be suppressed.

However, in an actual electric motor, depending on the structure of the stator and conditions of constraint, the moment M does not become 0 perfectly, so that it should be noted.

As mentioned above, basically, the rotor is divided into a plurality of pieces in the axial direction for each pole of the effective pole opening angle thereof, and the axial length and the electrical angle of each piece, assuming the axial length of one group of the rotor core as 2L, the axial direction as the x-axis, the axial center as x=0, and the electromagnetic exciting force in the radial direction as F(x), constitute an electric motor decided so as to hold the following three relational formulas:

$$\int_{-L}^{L} F(x)dx = 0$$

$$\int_{-L}^{L} xF(x)dx = 0$$

$$F(-x) = -F(x)$$

In the electric motor aforementioned, each one pole of the effective pole opening angle of the rotor is divided into four pieces respectively for the axial length 2L of the rotor core, and the ideal four pieces have an axial length of 0.29L, 0.71L, 0.71L, and 0.29L, and the pieces are arranged in the circumferential direction as the phase difference of the electrical angles of the neighboring pieces equivalent to 0, π, 0, and π.

The-axial length error of the four pieces of the effective pole opening angle aforementioned can be set within the range of ±5% of the total axial length of one group of the four pieces of the rotor core.

In the electric motor aforementioned, each one pole of the effective pole opening angle of the rotor is equally divided into six pieces respectively for the axial length 2L of one group of the rotor core, and the pieces can be arranged in the circumferential direction as the phase difference of the electrical angle of the neighboring pieces equivalent to 0, π, π, 0, 0, and π.

In the electric motor aforementioned, when each one pole of the effective pole opening angle of the rotor is divided into six pieces respectively for the axial length 2L of one group of the rotor core, from the position of x=0, the six pieces, assuming the respective junction faces as −b, −a, 0, a, and b, meet:

$$L^2=2(b^2-a^2)L^2$$

and are arranged in the circumferential direction as the phase difference of the electric angles of neighboring pieces equivalent to 0, π, 0, π, 0, and π.

Figure 7:
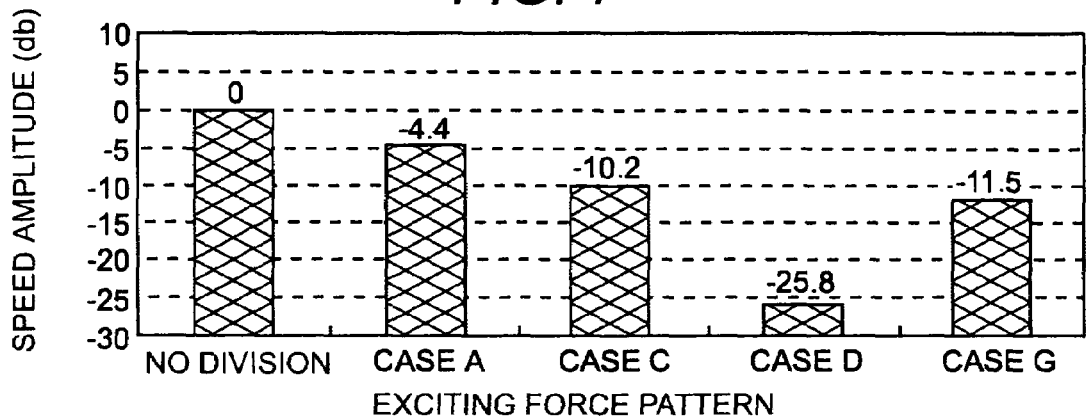
FIG. 7 is a diagram showing calculation results of the average vibration velocity of the electric motor by changing the electromagnetic radial force pattern.

On the basis of the aforementioned formulas and solutions, the means capable obtaining better results than the cases of no division case A, C and G shown in FIG. 7 and not meeting the aforementioned three formulas, is described. For example, in an electric motor composed of a rotor equipped with magnets and a stator having a plurality of slots, the rotor or stator is divided into 4 or 4n (n indicates an integer, 4 forms one group) pieces in the axial direction, and the axial length and the electrical angle of each piece, assuming the axial length of one group of the rotor core or stator core as 2L, the axial direction as the X-axis, the axial center as x=0, and the electromagnetic exciting force in the radial direction as F(x), on the basis of the following three relational formulas:

$$\int_{-L}^{L} F(x)dx=0$$

$$\int_{-L}^{L} xF(x)dx=0$$

$$F(-x)=-F(x)$$

are set according to the relationship between the equivalent axial length and the equivalent position shifted between the pieces in the circumferential direction and are arranged in the setting order, and each piece of one group of four pieces, as an equivalent axial length, can be set to any axial length within the range from 0.19L, 0.81L, 0.81L, and 0.19L to 0.50L, 0.50L, 0.50L, and 0.50Lx, and the effective pole opening angles are arranged in the circumferential direction as the phase difference of electrical angles of the neighboring pieces equivalent to 0, π, 0, π, 0, and π.

Further, for example, in an electric motor composed of a rotor equipped with magnets and a stator having a plurality of slots, the rotor or stator is divided into 4 or 4n (n indicates an integer, 4 forms one group) pieces in the axial direction, and the axial length and the electrical angle of each piece, assuming the axial length of one group of the rotor core or stator core as 2L, the axial direction as the X-axis, the axial center as x=0, and the electromagnetic exciting force in the radial direction as F(x), on the basis of the following three relational formulas:

$$\int_{-L}^{L} F(x)dx=0$$

$$\int_{-L}^{L} xF(x)dx=0$$

$$F(-x)=-F(x)$$

are set according to the relationship between the equivalent axial length and the equivalent position shifted between the pieces in the circumferential direction and are arranged in the setting order, and each piece of one group of four pieces, as an equivalent axial length, can be set to any axial length within the range from 0.19L, 0.81L, 0.81L, and 0.19L to 0.39L, 0.61L, 0.61L, and 0.39L.

As shown in FIG. 2, the effective pole opening angles are arranged in the circumferential direction as the phase difference of electrical angles of the neighboring pieces equivalent to 0, π, 0, and π. Further, the position in the circumferential direction is relative, so that π, 0, π, and 0 are equivalent to the aforementioned.

Figure 13:
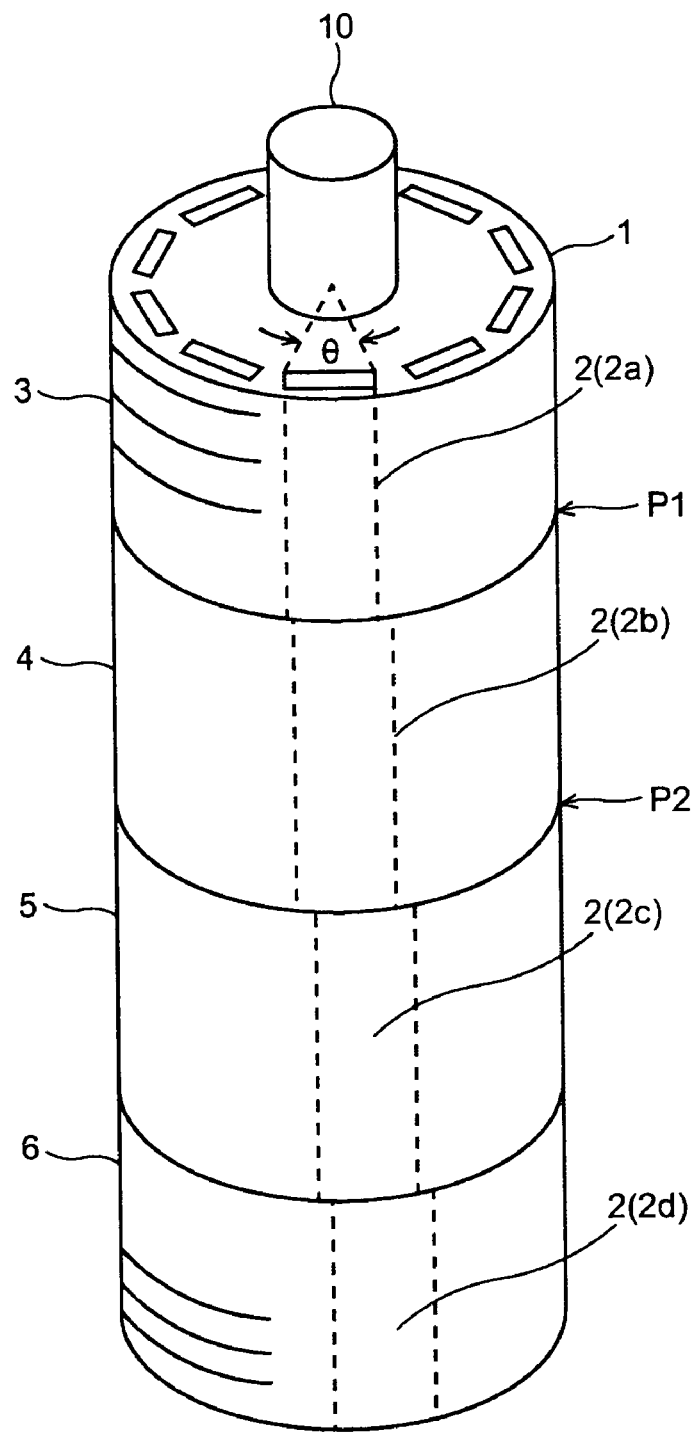
FIG. 13 is a schematic view showing another embodiment of the present invention shown in FIG. 1.

As a means for setting the phase difference of the electrical angle to π, it may be considered to shift respectively the positions of the permanent magnets 2 in the circumferential direction by one half of the slot. Two shifting ways may be considered as shown in FIGS. 1 and 13. The two ways may be selected from the viewpoint of motor efficiency and manufacture easiness.

Further, even when the rotor 1 is divided into six rotor pieces, the axial length can be decided similarly. This is equivalent to Case H shown in FIG. 2 which is a case meeting the aforementioned three formulas and in this case, between a and b shown in FIG. 2, the following relational formula is held.

Formula 9

$$L^2=2(b^2-a^2)L^2 \qquad \text{Formula 9}$$

As a solution meeting the above formula, for example, there are a=0.25 and b=0.75 available.

The axial length of the divided pieces in the arrangement order is 0.25L, 0.50L, 0.25L, 0.25L, 0.50L, and 0.25L.

For example, as an effective range, in an electric motor composed of a rotor equipped with magnets and a stator having a plurality of slots, the rotor or stator is divided into 6 or 6n (n indicates an integer, 6 forms one group) pieces in the axial direction, and the axial length and the electrical angle of each piece, assuming the axial length of one group of the rotor core or stator core as 2L, the axial direction as the X-axis, the axial center as x=0, and the electromagnetic exciting force in the radial direction as F(x), on the basis of the following three relational formulas:

$$\int_{-L}^{L} F(x)dx=0$$

$$\int_{-L}^{L} xF(x)dx=0$$

$$F(-x)=-F(x)$$

are set according to the relationship between the equivalent axial length and the equivalent position shifted between the pieces in the circumferential direction and are arranged in the setting order, and each piece of one group of six pieces, as an equivalent axial length, is set to a axial length of 0.25L, 0.50L, 0.25L, 0.25L, 0.50L, and 0.25L, and the effective pole opening angles are arranged in the circumferential direction as the phase difference of electrical angles of the neighboring pieces equivalent to 0, π, 0, and π.

Further, for example, in an electric motor composed of a rotor equipped with magnets and a stator having a plurality of slots, the rotor or stator is divided into 6 or 6n (n indicates an integer, 6 forms one group) pieces in the axial direction, and the axial length and the electrical angle of each piece, assuming the axial length of one group of the rotor core or stator core as 2L, the axial direction as the X-axis, the axial center as x=0, and the electromagnetic exciting force in the radial direction as F(x), on the basis of the following three relational formulas:

$$\int_{-L}^{L} F(x)dx = 0$$

$$\int_{-L}^{L} xF(x)dx = 0$$

$$F(-x) = -F(x)$$

are set according to the relationship between the equivalent axial length and the equivalent position shifted between the pieces in the circumferential direction and are arranged in the setting order, and each piece of one group of six pieces, as an equivalent axial length, on the basis of 0.25L, 0.50L, 0.25L, 0.25L, 0.50L, and 0.25L, is set to any axial length within the range of ±5% of the total axial length of one group of the six pieces, and the effective pole opening angles are arranged in the circumferential direction as the phase difference of electrical angles of the neighboring pieces equivalent to 0, π, 0, and π.

Further, when the axial length is set to 2nL, assuming 4-piece division or 6-piece division as one group, for n times of the 4-piece division or 6-piece division, the same effect can be obtained. By the 4-piece division and 6-piece division, as aforementioned, Case D and Case H are obtained and the numbers of divided pieces are desirable for manufacture.

Figure 5:
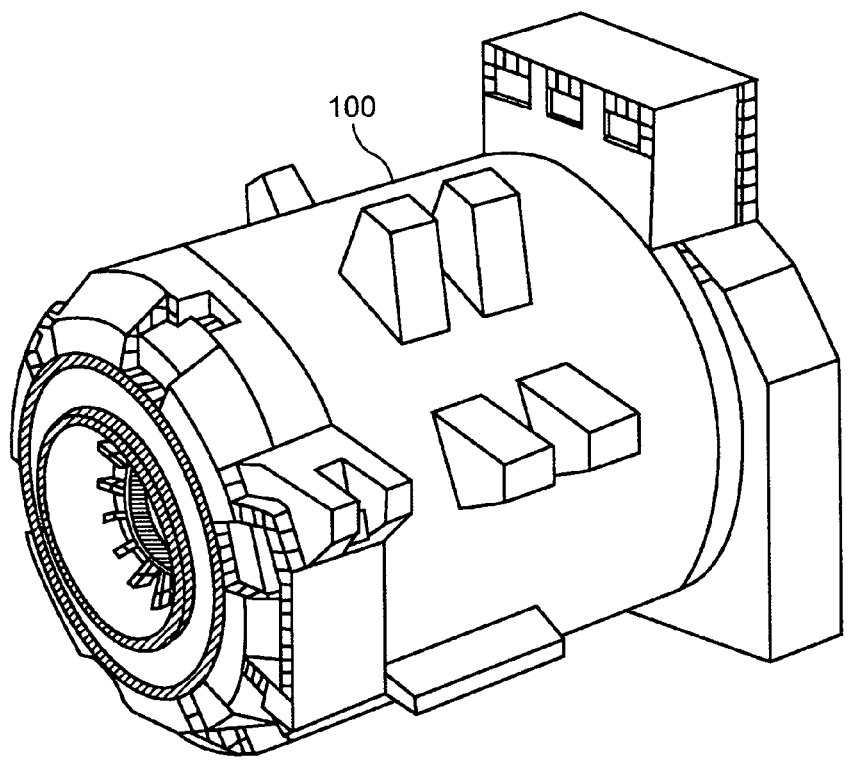
FIG. 5 is a drawing of the electric motor used for analysis.
Figure 6:
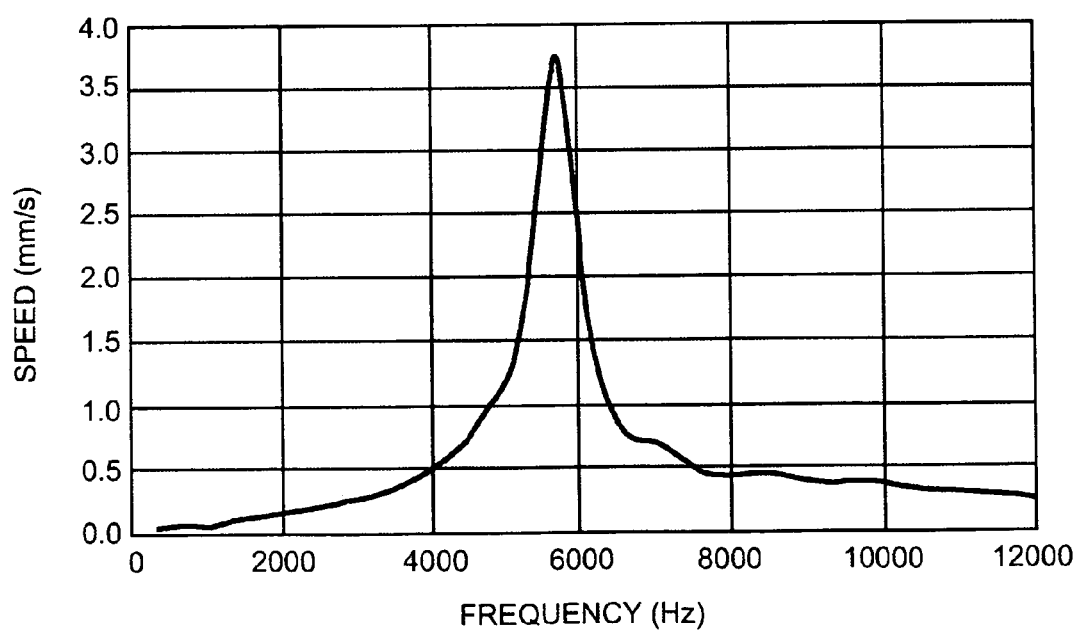
FIG. 6 is a frequency response diagram of the average vibration velocity excited by the electromagnetic force in the circular mode order(0) when the rotor is not divided.

Using the calculation model of the electric motor 100 shown in FIG. 5, the frequency response diagram of the average vibration velocity exited by the radial force of the circular mode order 0, when the rotor 1 is not divided, is shown in FIG. 6. The calculation model of the electric motor 100 has an external surface composed of a front bracket, a rear bracket, and a frame. The stator core 7 is inserted into the frame using the shrinkage fitting method. The rotor 1 is installed inside the electric motor 100 via bearings fitted into the brackets. The frequency response has a peak at 5645 Hz.

Figure 8:
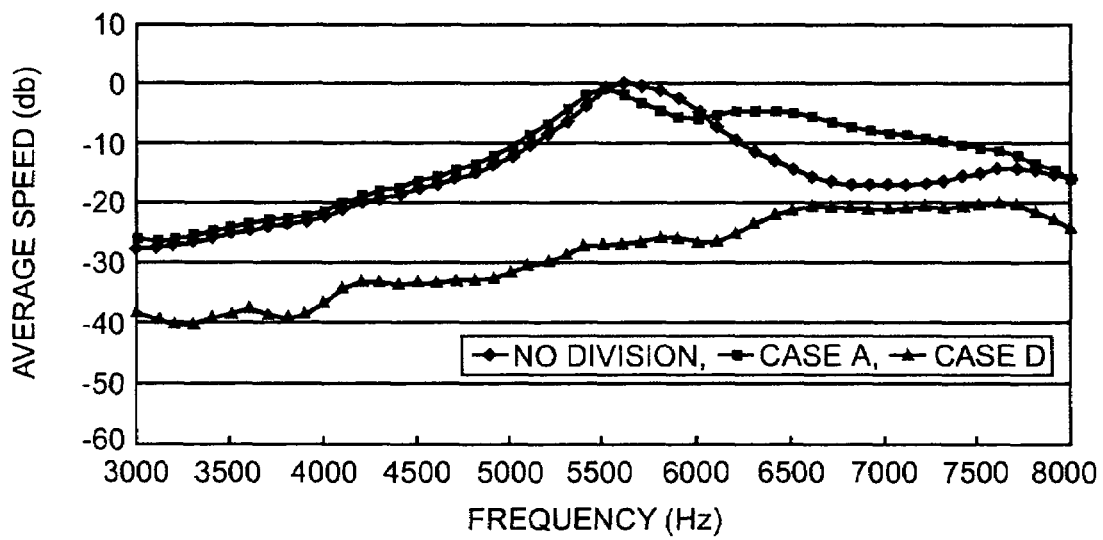
FIG. 8 is a diagram showing calculation results of the average vibrating velocity when a gear reducer is attached to the electric motor.

The peak amplitude of the average vibration velocity of the electric motor 100 are shown in FIG. 7, when the electromagnetic radial force pattern is changed and the electromagnetic radial force exciting the stator core, is the circular mode order 0, and the amplitude of the electromagnetic radial force is same in the longitudinal direction. The results show that the average vibration velocity when the stator core 7 is excited in Case D shown in FIG. 2 is reduced by about 25 dB in a case of no division and by 15 dB in Case C that the rotor 1 is equally divided into four parts and the phase difference of the electrical angle of each piece is set to 0, π, 0, and π. On the basis of an ideal axial length and electrical angle arrangement obtained from theoretical formulas, the axial length and the electrical angle arrangement of a group of the aforementioned four pieces are decided, thus better results than Case C or G are obtained. Namely, the average vibration velocity is reduced by 11.5 dB or more, for example, by 15 dB or 20 dB. These reductions can be realized by setting the equivalent axial length shown in each example of this embodiment to each piece axial length of the group FIG. 8 is a drawing showing calculation results of the average vibration velocity when a gear reducer is attached to the electric motor 100. FIG. 8 shows that the average vibration velocity of Case D for the electromagnetic exciting force is lower than the values of the other electromagnetic exciting force in the radial direction patterns and even if the gear reducer is attached, the vibration reduction effect is obtained.

Next, the vibration response when the phase switching position is changed by several % will be examined.

Figure 12:
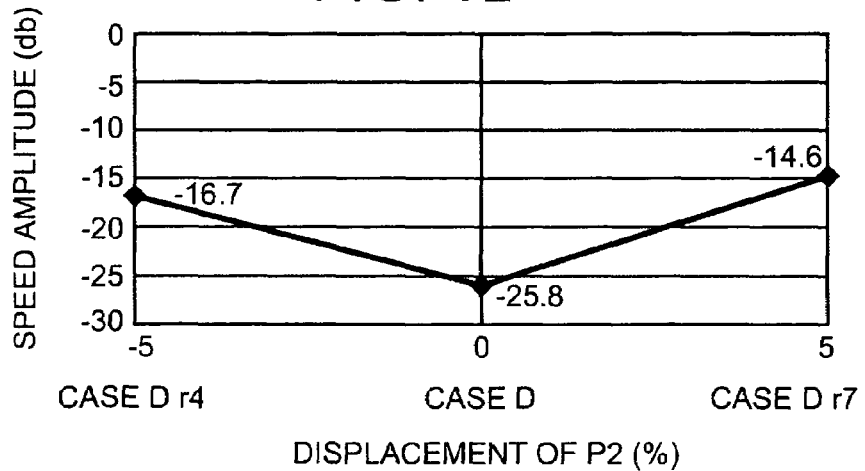
FIG. 12 is a diagram showing calculation results of the average vibration velocity by shifting the position P2 for switching the phase difference of the electromagnetic exciting force in the radial direction of Case D.
Figure 9:
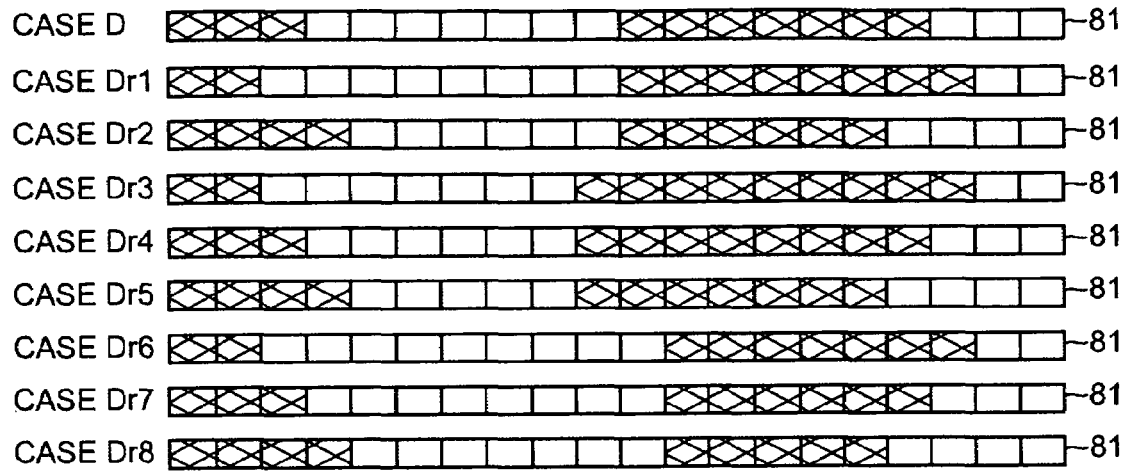
FIG. 9 is a diagram showing the position for switching the phase difference in the mesh diagram of the section of the stator core in the axial direction.
Figure 11:
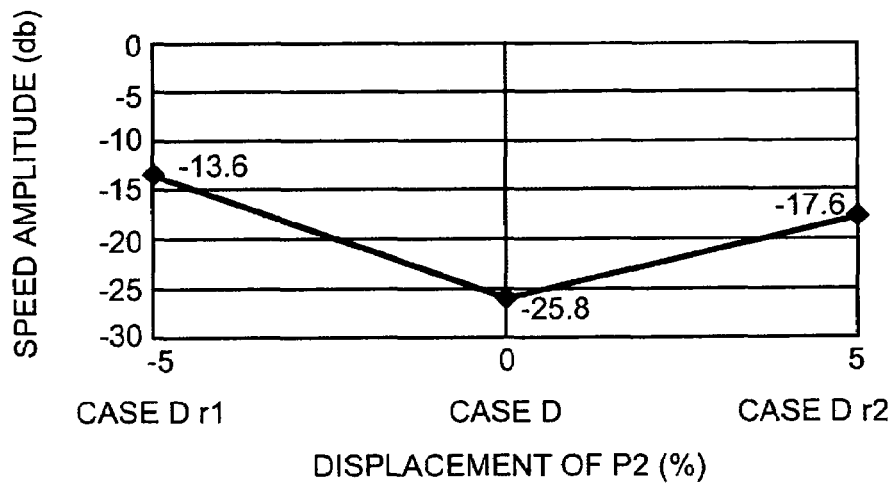
FIG. 11 is a diagram showing calculation results of the average vibration velocity by shifting the position P1 for switching the phase difference of the electromagnetic exciting force of Case D.
Figure 10:
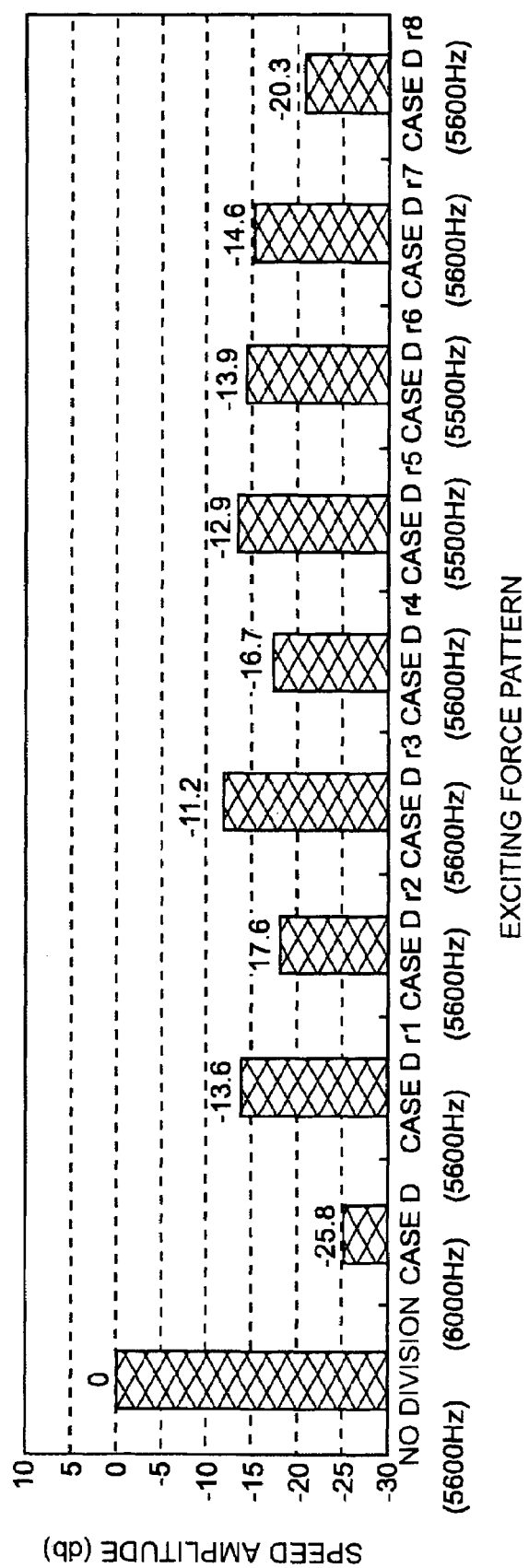
FIG. 10 is a diagram showing calculation results of the average vibration velocity by changing the position for switching the phase difference of the electromagnetic exciting force in the radial direction of Case D.

The number of mesh divisions of the mesh diagrams 81 of the section of the stator core in the axial direction is set to 20 (FIG. 9). The calculation results of the peak of the average vibration velocity when the switching position of a phase difference of 0 or π is changed by ±0.1L in the axial direction on the basis of Case D are shown in FIGS. 10, 11, and 12 and the switching patterns are shown in FIG. 9. FIG. 9 is a diagram showing the position for switching the phase difference in the mesh diagrams 81 of the section of the stator core in the axial direction. FIG. 10 is a diagram showing calculation results of the average vibration velocity by changing the position for switching the phase difference of the electromagnetic exciting force in the radial direction of Case D. FIG. 11 is a diagram showing calculation results of the average vibration velocity by shifting the position P1 (refer to FIG. 1) for switching the phase difference of the electromagnetic exciting force in the radial direction of Case D. FIG. 12 is a diagram showing calculation results of the average vibration velocity by shifting the position P2 for switching the phase difference of the electromagnetic exciting force in the radial direction of Case D. FIGS. 10, 11, and 12 show that the switching positions of the phase differences 0 and π of the electrical angle of Case D are optimal points. Further, even if the switching positions of the phase differences 0 and π are changed by ±5% of the axial length, an vibration reduction effect is obtained, and in every switching pattern, the average vibration velocity is reduced by 11 dB or more compared with the case of no division. The switching positions of the phase differences 0 and π include at least ±5% of changes.

Therefore, even if the axial lengths of the rotor pieces 3, 4, 5, and 6 are set to values which are changed from the ideal value and are slightly varied, as long as they are based on Case D, the electromagnetic exciting force in the radial direction of Case D produces the vibration reduction effect.

As mentioned above, in an electric motor composed of a rotor equipped with a magnet and a stator having a plurality of slots, the rotor or stator is divided into 4 or 4n (n indicates an integer, 4 forms one group) pieces in the axial direction, and the axial length and the electrical angle of each piece, assuming the axial length of one group of the rotor core or stator core as 2L, the axial direction as the X-axis, the axial center as x=0, and the electromagnetic exciting force in the radial direction as F(x), on the basis of the following three relational formulas:

$$\int_{-L}^{L} F(x)dx = 0$$

$$\int_{-L}^{L} xF(x)dx = 0$$

$$F(-x) = -F(x)$$

are set according to the relationship between the equivalent axial length and the equivalent position shifted between the pieces in the circumferential direction and are arranged in the setting order, and each piece of one group of four pieces, as an equivalent axial length, on the basis of 1:2:2:1, is set to any axial length within the range of ±5% of the total axial length of one group of the four pieces, and the effective pole opening angles are arranged in the circumferential direction as the phase difference of electrical angles of the neighboring pieces equivalent to 0, π, 0, and π.

Thus far, for the harmonic component of the electromagnetic exiting force of the circular mode order 0, the vibration reduction effect of the electromagnetic exciting force pattern in the radial direction of Case D has been examined, though for the harmonic component of the electromagnetic exiting force of the circular mode another order, the similar results can be obtained.

Figure 14:
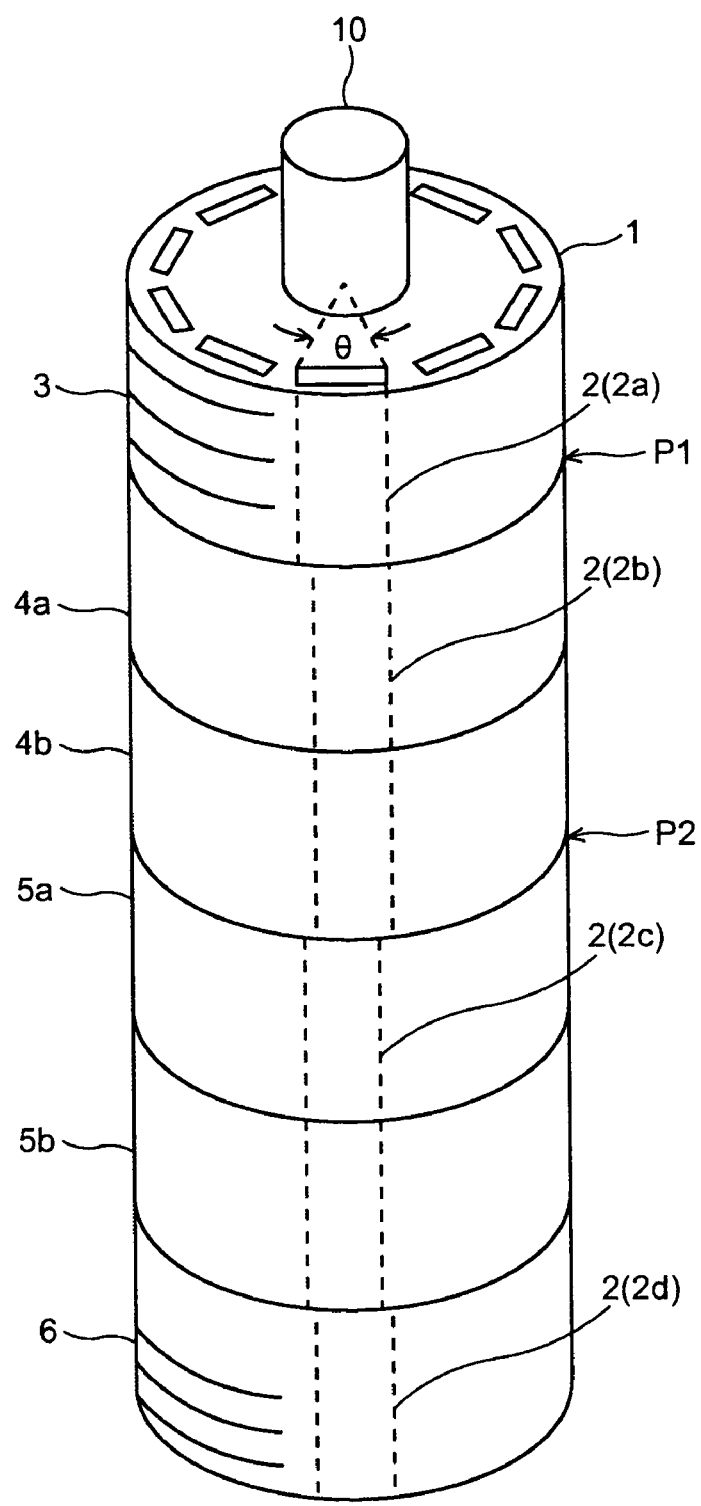
FIG. 14 is a schematic view showing still another embodiment of the present invention shown in FIG. 1.

FIG. 14 shows another embodiment. In this embodiment, on the assumption that the three formulas aforementioned are satisfied, the rotor 1 is divided into 6 pieces of rotor pieces 3, 4a, 4b, 5a, 5b, and 6 having the same axial length (1/3L) and the phase difference of the electrical angle between the permanent magnet 2a having the effective magnetic pole opening angle θ of the rotor piece 3, the permanent magnet 2b having the effective pole opening angle θ of the rotor pieces 4a and 4b, the permanent magnets 2c having the effective magnetic pole opening angle θ of the rotor pieces 5a and 5b, and the permanent magnets 2d having the effective magnetic pole opening angle θ of the rotor pieces 6 is set to 0, π, 0, and π. By use of this constitution, the rotor pieces 3, 4a, 4b, 5a, 5b, and 6 can be formed with the same axial length and the preparation cost can be decreased. Further, this is a constitution within the division range in the axial direction producing the vibration reduction effect.

Figure 15:
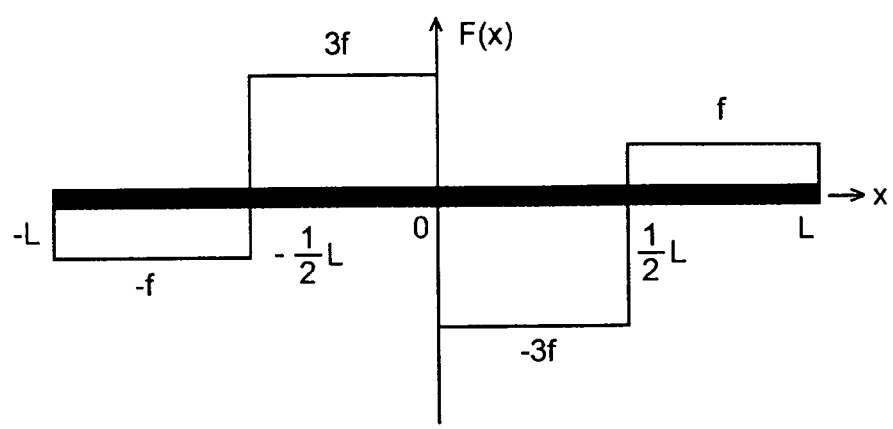
FIG. 15 is a schematic view showing another embodiment of the exciting force pattern of the rotor piece when the rotor core is divided into 4 pieces.

The case that the electromagnetic exciting force in the axial direction having a same amplitude in the axial direction is applied is described above. This concept can be applied also to a case that the division width of the axial length is fixed and the amplitude of the electromagnetic exciting force in the radial direction is changed in the axial direction. For example, as shown in FIG. 15, the rotor 1 with an axial length of 2L is equally divided into four rotor pieces and assuming the phase difference of the electrical angle of each piece as 0, π, 0, and π, the axial direction as the X-axis, and the range of x as $-L \leq x \leq L$, a constitution that the amplitude of the electromagnetic exciting force at the range of X as in the radial direction $-L/2 \leq x \leq 0$ and $0 \leq x \leq L/2$ close to the central point O of the X-axis is 3 times (a multiple of the set reference exciting force) of the amplitude of the electromagnetic exciting force in the radial direction at the range of X as $-L \leq x \leq L$ and $-L/2 \leq x \leq L$ meets Formulas 1, 2 and 3.

Therefore, synthetically, in an electric motor composed of a rotor equipped with magnets and a stator having a plurality of slots, the rotor or stator is divided into even pieces such as 4 pieces or more in the axial direction, and the axial length and electrical angle of each piece, assuming the axial length of one group of the rotor core or stator core as 2L, the axial direction as the X-axis, the axial center as x=0, and the electromagnetic exciting force in the radial direction as F(x), on the basis of the following three relational formulas:

$$\int_{-L}^{L} F(x)dx = 0$$

$$\int_{-L}^{L} xF(x)dx = 0$$

$$F(-x) = -F(x)$$

are set according to the relationship between the equivalent axial length and the equivalent position shifted between the pieces in the circumferential direction and are arranged in the setting order.

In any of the aforementioned examples, the electric motor is structured so as to arrange the effective pole opening angles of each piece at an angle shifted by one half of the slot between the pieces.

As an actual embodiment, in an electric motor composed of a rotor equipped with magnets and a stator having a plurality of slots, the rotor or stator is divided into 4 or 4n (n indicates an integer, 4 forms one group) pieces in the axial direction, and assuming the axial length of one group of the rotor core or stator core as 2L, the amplitude of the electromagnetic exciting force in the radial direction practically same in the axial direction of each piece, and each piece of one group of four pieces, as an equivalent axial length, is set to any axial length within the range from 0.19L, 0.81L, 0.81L, and 0.19L to 0.39L, 0.61L, 0.61L, and 0.39L, and the effective pole opening angles are arranged in the circumferential direction as the phase difference of electrical angles of the neighboring pieces equivalent to 0, π, 0, and π.

Further, in an electric motor composed of a rotor equipped with magnets and a stator having a plurality of slots, the rotor and/or stator is divided into 4 or 4n (n indicates an integer, 4 forms one group) pieces in the axial direction, and the amplitude of the electromagnetic exciting force in the radial direction practically same the axial direction of each piece, and each piece of one group of four pieces, as an equivalent axial length, on the basis of 1:2:2:1, is set to any axial length within the range of ±5% of the total axial length of one group of the four pieces, and the effective pole opening angles are arranged in the circumferential direction as the phase difference of electrical angles of the neighboring pieces equivalent to 0, π, 0, and π.

Further, in an electric motor composed of a rotor equipped with magnets and a stator having a plurality of slots, the rotor or stator is divided into 6 or 6n (n indicates an integer, 6 forms one group) pieces in the axial direction, and assuming the axial length of one group of the rotor core or stator core as 2L, the amplitude of the electromagnetic exciting force in the radial direction practically same in the axial direction of each piece, and each piece of one group of six pieces, as an equivalent axial length, on the basis of 0.25L, 0.50L, 0.25L, 0.25L, 0.50L, and 0.25L, is set to any axial length within the range of ±5% of the total axial length of one group of the six pieces, and the effective pole opening angles are arranged in the circumferential direction as the phase difference of electrical angles of the neighboring pieces equivalent to 0, π, 0, and π.

Figure 17:
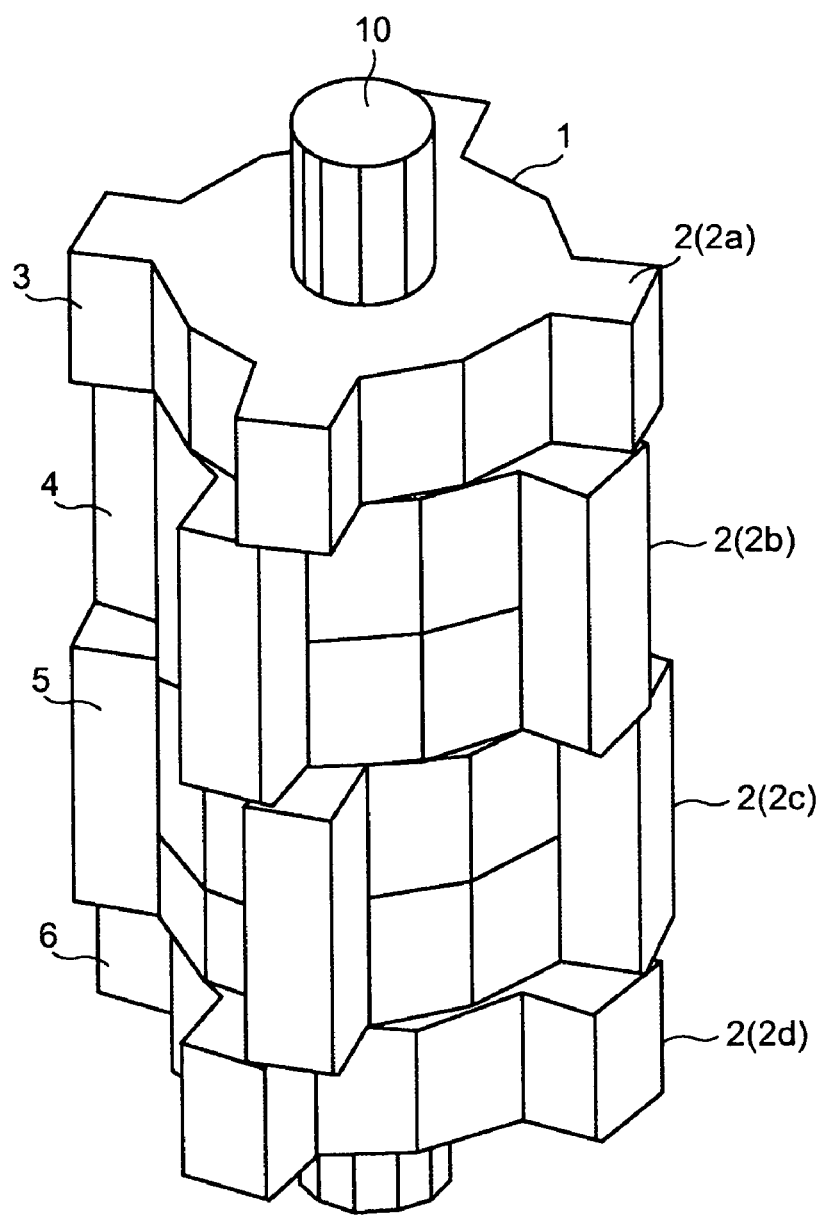
FIG. 17 is a drawing showing an application example of the present invention shown in FIG. 1 to a switched reluctance motor.
Figure 18:
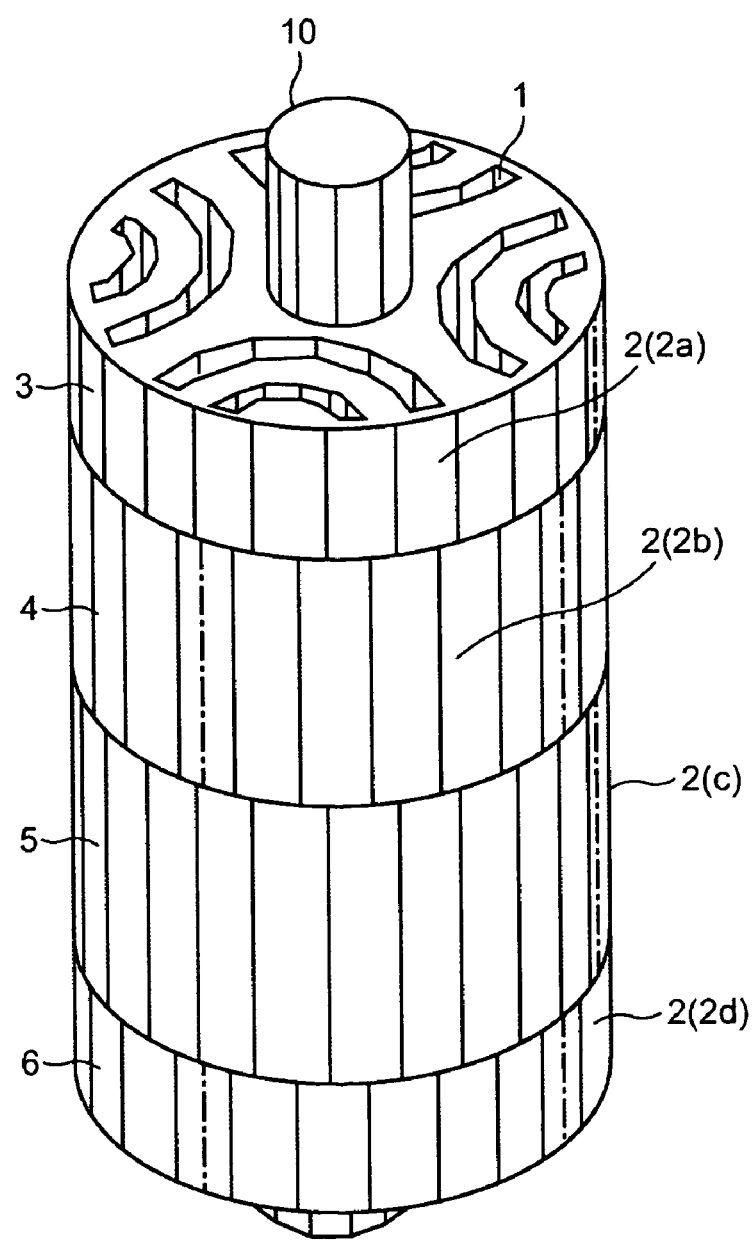
FIG. 18 is a drawing showing an application example of the present invention shown in FIG. 1 to a synchronous reluctance motor.
Figure 19:
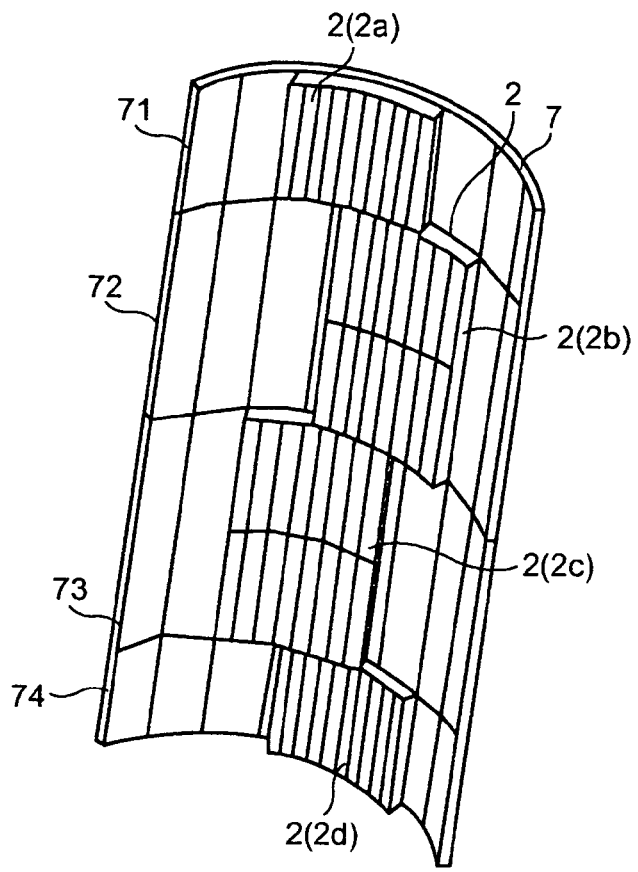
FIG. 19 is a drawing showing an application example of the present invention shown in FIG. 1 to a brushless motor.

Further, the electromagnetic exciting force pattern can be applied not only to the permanent magnet motor but also to the synchronous reluctance motor shown in FIG. 18, the switched reluctance motor shown in FIG. 17, and the brushless DC motor shown in FIG. 19. Therefore, a magnet other than a permanent magnet can be used and for example, an electromagnet is available.

Furthermore, in the brushless DC motor shown in FIG. 19, the magnets 2 is arranged in the stator core 7. The stator core 7 is divided into four pieces such as stator core pieces 71, 72, 73, and 74. Even if the stator core 7 is divided like this, the same effect can be obtained.

Figure 20:
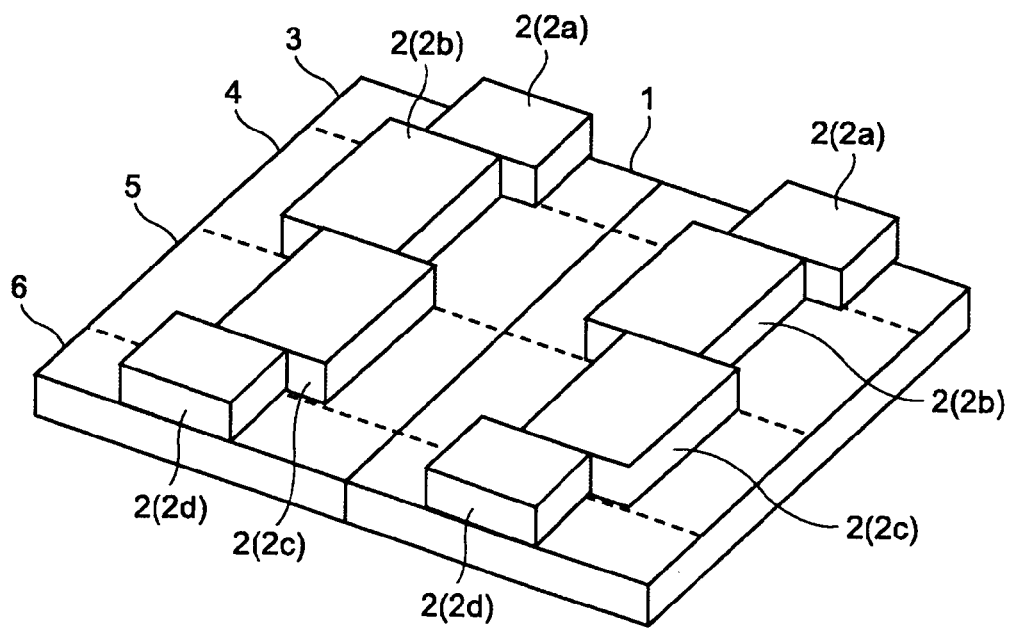
FIG. 20 is a drawing showing an application example of the present invention shown in FIG. 1 to a linear motor.
Figure 21:
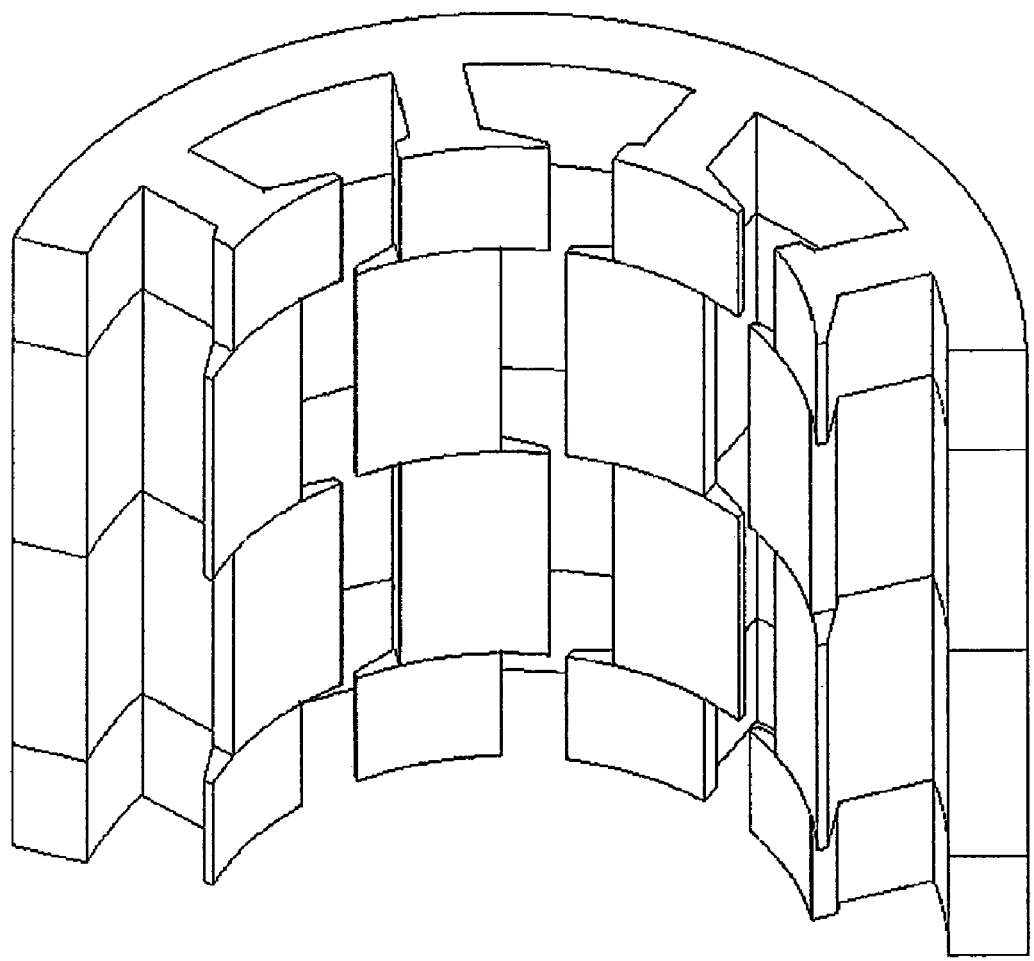
FIG. 21 is a drawing showing a stator divided into four pieces.
Figure 22:
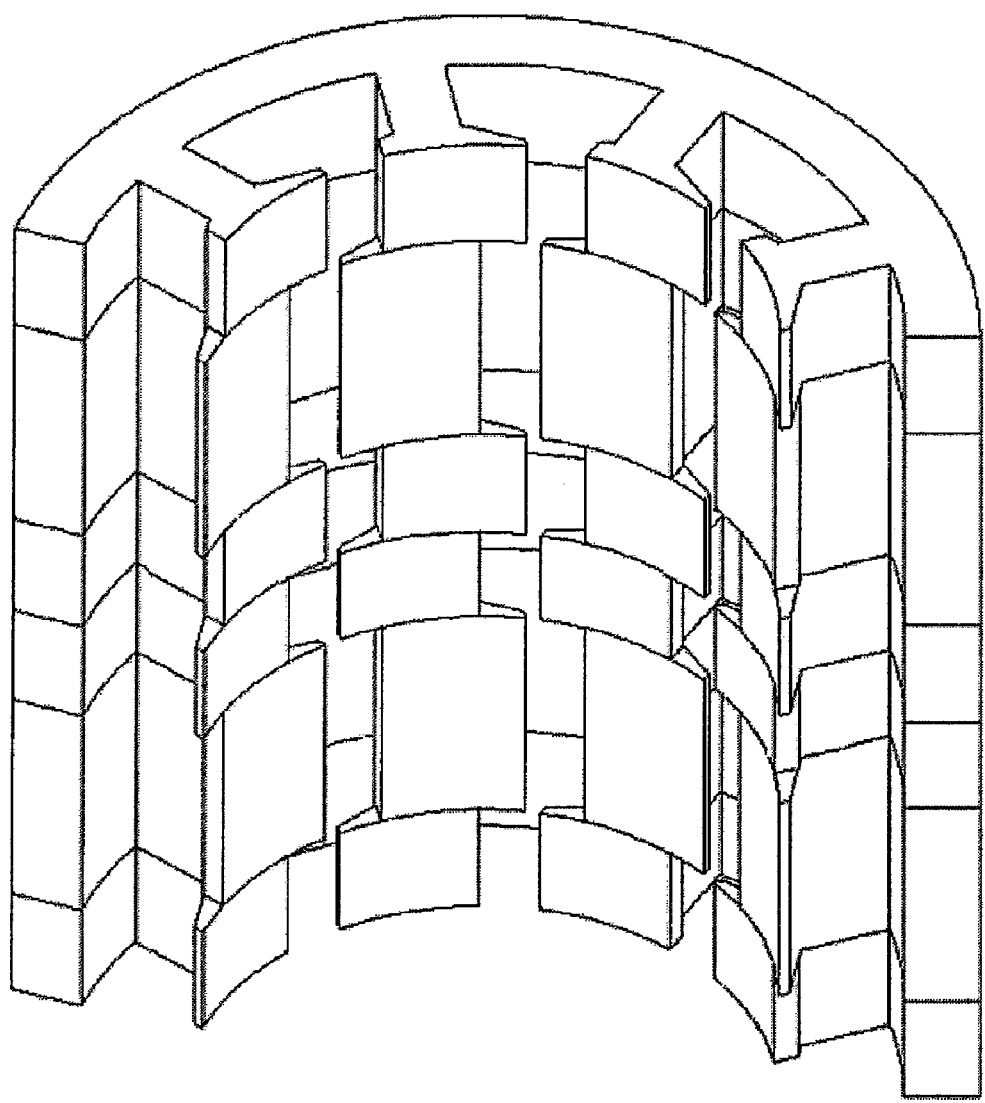
FIG. 22 is a drawing showing a stator divided into six pieces.

Further, as shown in FIG. 20, the present invention can be applied to a linear motor. At this time, it may be considered that the rotor 1 is cut off at one point and the cylindrical face is developed to a plane. At this time, it may be considered that the electromagnetic exciting force in the radial direction cuts off a part of the circular mode at one point and the cylindrical face is developed to a plane.

INDUSTRIAL FIELD OF APPLICATION

The electric motor of the present invention is effective in reducing, among vibration and noise caused by the drive operation, vibration and noise of the motor excited by the electromagnetic exciting force in the radial direction.

What is claimed is:

1. An electric motor comprising a rotor equipped with magnets and a stator having a plurality of slots, wherein:
said rotor or said stator is divided into four pieces of a first piece, a second piece, a third piece and a fourth piece in an axial direction, and an axial length and an electrical angle of said each piece, assuming an axial length of said four pieces of said rotor core or said stator core as 2L, with L being an axial length dimension, said axial direction as a X-axis, an axial center as x=0, and electromagnetic exciting force in a radial direction as F(x), on the basis of following three relational formulas:

$$\int_{-L}^{L} F(x)dx = 0$$

$$\int_{-L}^{L} xF(x)dx = 0$$

$$F(-x) = -F(x)$$

are set according to a relationship between an equivalent axial length and an equivalent position shifted between said pieces in a circumferential direction and are arranged in a setting order, and a length of said first piece in said axial direction is from 0.19L to 0.39L, a length of said second piece in said axial direction is from 0.81L to 0.61L, a length of said third piece in said axial direction is from 0.81L to 0.61L, and a length of said fourth piece in said axial direction is from 0.19L to 0.39L, and effective pole opening angles are arranged in a circumferential direction as phase difference of electrical angles of said neighboring pieces equivalent to 0, π, 0, and π.

2. An electric motor comprising a rotor equipped with magnets and a stator having a plurality of slots, wherein:

said rotor or said stator is divided into four pieces of a first piece, a second piece, a third piece and a fourth piece in an axial direction, and an axial length and an electrical angle of said each piece, assuming an axial length of said rotor core or said stator core as 2L, with L being an axial length dimension, said axial direction as a X-axis, an axial center as x=0, and electromagnetic exciting force in a radial direction as F(x), on the basis of following three relational formulas:

$\int_{-L}^{L} F(x)dx = 0$ $\int_{-L}^{L} xF(x)dx = 0$ $F(-x) = -F(x)$ are set according to a relationship between an equivalent axial length and an equivalent position shifted between said pieces in a circumferential direction and are arranged in a setting order, and each length of said first piece, said second piece, said third piece and said fourth piece in said axial direction, as said equivalent axial length, is set on the basis of 1:2:2:1 ratio, within a range of ±5% of a total axial length of said four pieces, and effective pole opening angles are arranged in the circumferential direction as a phase difference of electrical angles of said neighboring pieces equivalent to 0, π, 0, and π.

3. An electric motor comprising a rotor equipped with magnets and a stator having a plurality of slots, wherein:

said rotor or said stator is divided into six pieces of a first piece, a second piece, a third piece, a fourth piece, a fifth piece and a sixth piece in an axial direction, and an axial length and an electrical angle of said each piece, assuming an axial length of said rotor core or said stator core as 2L, with L being an axial length dimension, said axial direction as a X-axis, an axial center as x=0, and electromagnetic exciting force in a radial direction as F(x), on the basis of following three relational formulas:

$\int_{-L}^{L} F(x)dx = 0$ $\int_{-L}^{L} xF(x)dx = 0$ $F(-x) = -F(x)$ are set according to a relationship between an equivalent axial length and an equivalent position shifted between said pieces in a circumferential direction and are arranged in a setting order, and an axial length of said each piece of said six pieces, as said equivalent length, on the basis of 0.25L, 0.50L, 0.25L, 0.25L, 0.50L, and 0.25L, is respectively set within a range of ±5% of a total axial length of said six pieces, or within a range of lengths in said axial direction of said first piece set on from 0.25L to 1/3L, said second piece set on from 0.50L to 1/3L, said third piece set on from 0.25L to 1/3L, set fourth piece set on from 0.25L to 1/3L, said fifth piece set on from 0.50L to 1/3L and said sixth piece set on from 0.25L to 1/3L, and effective pole opening angles are arranged in the circumferential direction as a phase difference of electrical angles of said neighboring pieces equivalent to 0, π, 0, π, 0 and π.

4. An electric motor comprising a rotor equipped with magnets and a stator having a plurality of slots, wherein:

said rotor or said stator is divided into six pieces of a first piece, a second piece, a third piece, a fourth piece, a fifth piece and a sixth piece in an axial direction, and a longitudinal length and an electrical angle of said each piece, assuming an axial length of said rotor core or said stator core as 2L, with L being an axial length dimension, said axial direction as a X-axis, an axial center as x=0, and electromagnetic exciting force in a radial direction as F(x), on the basis of following three relational formulas:

$\int_{-L}^{L} F(x)dx = 0$ $\int_{-L}^{L} xF(x)dx = 0$ $F(-x) = -F(x)$ are set according to a relationship between an equivalent axial length and an equivalent position shifted between said pieces in a circumferential direction and are arranged in a setting order, and an axial length of said six pieces, as said equivalent length, of said first piece set on 0.25L, said second piece set on 0.50L, said third piece set on 0.25L, said fourth piece set on 0.25L, said fifth piece set on 0.50L, and said sixth piece set on 0.25L, is set within a range of ±5% of a total axial length of said one group of said six pieces, and effective pole opening angles are arranged in the circumferential direction as a phase difference of electrical angles of said neighboring pieces equivalent to 0, π, 0, π, 0, and π.

5. An electric motor comprising a rotor equipped with magnets and a stator having a plurality of slots, wherein:

said rotor or said stator is divided into four pieces of a first piece, a second piece, a third piece and a fourth piece in an axial direction, and electromagnetic exciting force in a radial direction having a practically same amplitude is applied to said each piece, and assuming an axial length of said one group of said rotor or said stator as 2L with L being an axial length dimension, said each piece of said four pieces, as an equivalent axial length, is respectively set within a range from 0.19L to 0.39L relating to said first piece, 0.81L to 0.61L relating to said second piece, 0.81L to 0.61L relating to said third piece and from or 0.19L to 0.39L relating to said fourth piece, and effective pole opening angles are arranged in the circumferential direction as a phase difference of electrical angles of said neighboring pieces equivalent to 0, π, 0, and π.

6. An electric motor composed of a rotor equipped with magnets and a stator having a plurality of slots, wherein:

said rotor or said stator is divided into four pieces of a first piece, a second piece, a third piece and a fourth piece in an axial direction, and electromagnetic exciting force having a practically same amplitude in a radial direction is applied to said each piece, and an axial length of said each piece of said four pieces, as an equivalent axial length, on the basis of 1:2:2:1 ratio, is set to any axial length within a range of ±5% of a total axial length of said one group of said four pieces, and effective pole opening angles are arranged in the circumferential direction as a phase difference of electrical angles of said neighboring pieces equivalent to 0, π, 0, and π.

7. An electric motor comprising a rotor equipped with magnets and a stator having a plurality of slots, wherein:
said rotor or said stator is divided into six pieces of a first piece, a second piece, a third piece, a fourth piece, a fifth piece and a sixth piece in an axial direction, and electromagnetic exciting force in a radial direction having a practically same amplitude is applied to said each piece, and assuming an axial length of said one group of said rotor or said stator as 2L, an axial length of said each piece of said six pieces, as said equivalent axial length of said first piece set on 0.25L, of said second piece set on 0.50L, of said third piece set on 0.25L, of said fourth piece set on 0.25L, of said fifth piece set on 0.50L, and of said sixth piece set on 0.25L, is set within a range of ±5% of a total axial length of said one group of said six pieces, and effective pole opening angles are arranged in the circumferential direction as a phase difference of electrical angles of said neighboring pieces equivalent to 0, π, 0, π, 0, and π.

8. An electric motor according claim 1 wherein said effective pole opening angles of said each piece are set to an angle shifted by one half of said slot between said pieces.

9. An electric motor according claim 1, wherein when said electric motor is a linear motor, said rotor and said stator are in a shape developed on a plane.

10. An electric motor according to claim 2, wherein said effective pole opening angles of said each piece are set to an angle shifted by one half of said slot between said pieces.

11. An electric motor according to claim 3, wherein said effective pole opening angles of said each piece are set to an angle shifted by one half of said slot between said pieces.

12. An electric motor according to claim 4, wherein said effective pole opening angles of said each piece are set to an angle shifted by one half of said slot between said pieces.

13. An electric motor according to claim 2, wherein when said electric motor is a linear motor, said rotor and said stator are in a shape developed on a plane.

14. An electric motor according to claim 3, wherein when said electric motor is a linear motor, said rotor and said stator are in a shape developed on a plane.

15. An electric motor according to claim 4, wherein when said electric motor is a linear motor, said rotor and said stator are in a shape developed on a plane.

* * * * *